United States Patent
Furukawa et al.

(10) Patent No.: US 7,140,097 B2
(45) Date of Patent: Nov. 28, 2006

(54) METHOD OF MANUFACTURING CHIP-TYPE CERAMIC ELECTRONIC COMPONENT

(75) Inventors: Noboru Furukawa, Yokaichi (JP); Masahiko Kawase, Yokaichi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 339 days.

(21) Appl. No.: 10/633,642

(22) Filed: Aug. 5, 2003

(65) Prior Publication Data

US 2004/0064940 A1    Apr. 8, 2004

(30) Foreign Application Priority Data

Oct. 2, 2002    (JP) .............................. 2002-290286

(51) Int. Cl.
    *H01C 17/00*    (2006.01)
(52) U.S. Cl. .................. 29/610.1; 29/611; 29/612; 338/195; 338/22 R
(58) Field of Classification Search .............. 29/610.1, 29/611, 612; 338/195, 314, 225 D, 22 R, 338/22 SD See application file for complete search history.

(56) References Cited

U.S. PATENT DOCUMENTS 6,588,094 B1 *   7/2003   Furukawa et al. ......... 29/610.1

FOREIGN PATENT DOCUMENTS

| JP | 2000-091105 | 3/2000 |
|----|-------------|--------|
| JP | 2000-106304 | 4/2000 |
| JP | 2000-124006 | 4/2000 |
| JP | 2000-124007 | 4/2000 |

* cited by examiner

Primary Examiner—Richard Chang
(74) Attorney, Agent, or Firm—Keating & Bennett, LLP

(57) ABSTRACT

A method of manufacturing a chip-type ceramic electronic component having stable electrical properties and excellent mechanical strength includes the steps of providing a plurality of green sheets having predetermined cutting positions, coating inorganic paste including the same ceramic material as that included in ceramic green sheets, and an inorganic material having higher resistivity than that of the ceramic material, on a region of each ceramic green sheet, and laminating a predetermined number of the ceramic green sheets to form a ceramic laminated product. Then, the ceramic laminated product is cut into a chip at the predetermined cutting positions and sintered to form a ceramic sintered compact, and external electrodes are formed at both ends of the ceramic sintered compact.

6 Claims, 8 Drawing Sheets

4

6

METHOD OF MANUFACTURING CHIP-TYPE CERAMIC ELECTRONIC COMPONENT

BACKGROUND OF THE INVENTION

1. Field of the Invention

The present invention relates to a method of manufacturing a chip-type ceramic electronic component that is suitable for surface mounting.

2. Description of the Related Art

Electrolytic plating of external electrodes of a chip-type ceramic electronic component has the problem of changing characteristics due to corrosion and dissolution of an exposed surface of a ceramic sintered compact. Therefore, in electrolytic plating, an insulating layer such as a glass layer is previously formed on the surface of the ceramic sintered compact, for preventing corrosion of the ceramic sintered compact.

FIG. 6 is a sectional view showing a conventional chip-type ceramic electronic component (chip-type thermistor). As shown in FIG. 6, a chip-type thermistor 11 includes a ceramic sintered compact 12, a glass diffused layer 13 located near the outer surface except at both ends of the ceramic sintered compact 12, and external electrodes 14 disposed at both ends of the ceramic sintered compact 12. Each of the external electrodes 14 includes an underlying electrode layer 14a formed by baking Ag, and a plated layer 14b formed on the underlying electrode layer 14a and including two layers of Ni and Sn (refer to, for example, Japanese Unexamined Patent Application Publication No. 2000-124007).

The ceramic sintered compact 12 is obtained by laminating a plurality of ceramic green sheets, and press-bonding the ceramic green sheets to form a ceramic laminated product, and then sintering the ceramic laminated product. Specifically, as shown in FIG. 7, a predetermined number of ceramic green sheets 16a each having glass paste 15 coated at both side ends of a main surface are laminated, and ceramic green sheets 16b each having the glass paste 15 coated over the entire main surface are placed at the top and bottom of the laminate of the ceramic green sheets 16a, and then the resultant laminate is press-bonded to form a ceramic laminated product.

In sintering the ceramic laminated product, the glass components contained in the glass paste 15 diffuse to the vicinity of the outer surface of the ceramic sintered compact 12, forming the glass diffused layer 13.

However, when the ceramic laminated product is sintered at a high temperature, the glass components of the glass paste are likely to excessively diffuse to the vicinity of the outer surface of the ceramic sintered compact. Therefore, as shown in FIG. 8, cavities 17 occur in the glass paste-coated portions in the ceramic sintered compact 12. As a result, in electrolytic plating of the external electrodes 14, a plating solution enters into the ceramic sintered compact 12 through the cavities 17 to cause the problem of corrosion of the ceramic sintered compact 12.

SUMMARY OF THE INVENTION

In order to overcome the problems described above, preferred embodiments of the present invention provide a method of manufacturing a chip-type ceramic electronic component that prevents cavitation of a diffusion layer of a high-resistivity inorganic material which is formed on the surface of a ceramic sintered compact, thereby preventing corrosion of the ceramic sintered compact.

A method of manufacturing a chip-type ceramic electronic component of a preferred embodiment of the present invention includes the steps of preparing ceramic green sheets, coating an inorganic material on a region which includes predetermined cutting positions of each of the ceramic green sheets, laminating a predetermined number of the ceramic green sheets to form a ceramic laminated product, cutting the ceramic laminated product at the predetermined cutting positions to form a chip, sintering the chip to form a ceramic sintered compact, and then forming external electrodes at both ends of the ceramic sintered compact, wherein the inorganic material includes the same ceramic material as that included in the ceramic green sheets and an inorganic material having higher resistivity than that of the ceramic material.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A method of manufacturing a chip-type ceramic electronic component according to preferred embodiments of the present invention will be described below with reference to FIGS. 1 to 5.

First, predetermined amounts of an organic binder, a dispersant, a surfactant, an antifoaming agent, a solvent, and other suitable materials are added to a ceramic powder to prepare ceramic slurry. As the ceramic powder, various powders can be used according to different specific uses. For example, in manufacturing a chip-type thermistor, oxides of at least two metals selected from Mn, Ni, Co, Fe, and Cu can be used as the ceramic powder. Next, the ceramic slurry is formed into a sheet by a known process such as a doctor blade process or other suitable process to prepare a ceramic green sheet.

Figure 1A:
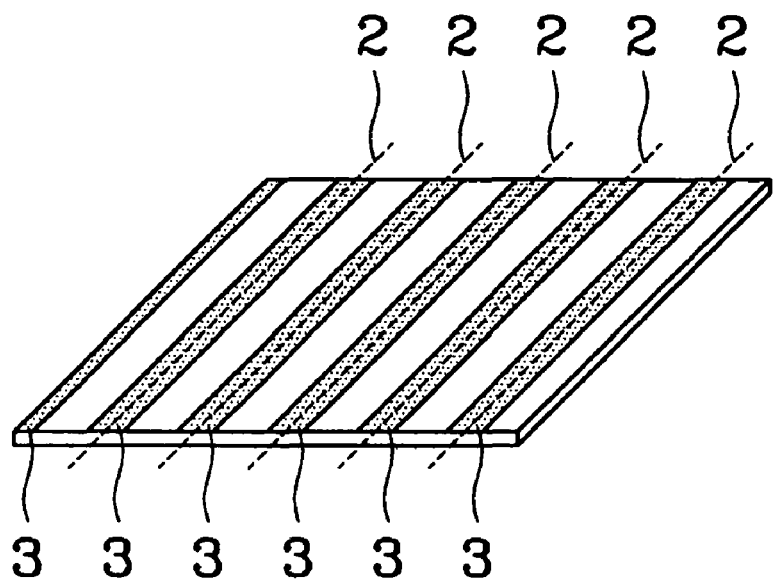
FIGS. 1A and 1B are schematic perspective views showing a step of a method of manufacturing a chip-type ceramic electronic component according to a preferred embodiment of the present invention.
Figure 1B:
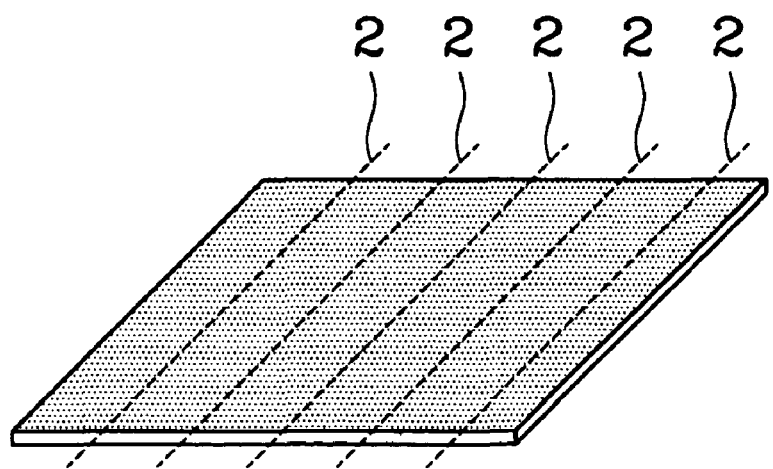

Next, as shown in FIGS. 1A and 1B, inorganic paste 3 is coated on a region of each of ceramic green sheets 1a and 1b, including predetermined cutting portions (dotted lines 2 in the drawings). In the ceramic green sheet 1a, the inorganic paste 3 is coated on a main surface in such a manner that the inorganic paste 3 is present at the ends of each ceramic green sheet 1a after cutting. On the other hand, in the ceramic green sheet 1b, the inorganic paste 3 is coated over the entire region of a main surface.

The inorganic paste 3 includes the same ceramic material as that included in the ceramic green sheets 1, and an inorganic material having higher resistivity than that of the ceramic material. For example, when oxides of at least two metals selected from Mn, Ni, Co, Fe and Cu are used as the ceramic material, a metal oxide of Al, Si, Zn, or other suitable material, or glass can be used as the inorganic material having higher resistivity than that of the ceramic material. Particularly, glass is preferably used as the inorganic material having higher resistivity than that of the ceramic material because the inorganic paste 3 appropriately diffuses to the outer surface of the ceramic sintered compact during sintering.

When the inorganic paste 3 includes a total of 100% by weight of inorganic materials, the content of the same ceramic material as that contained in the ceramic green sheets 1 is preferably about 5% to about 50% by weight, and the content of the inorganic material having higher resistivity than that of the ceramic material is preferably about 50% to about 95% by weight. With the contents in these ranges, corrosion of the ceramic sintered compact can be effectively prevented during electrolytic plating.

Figure 2A:
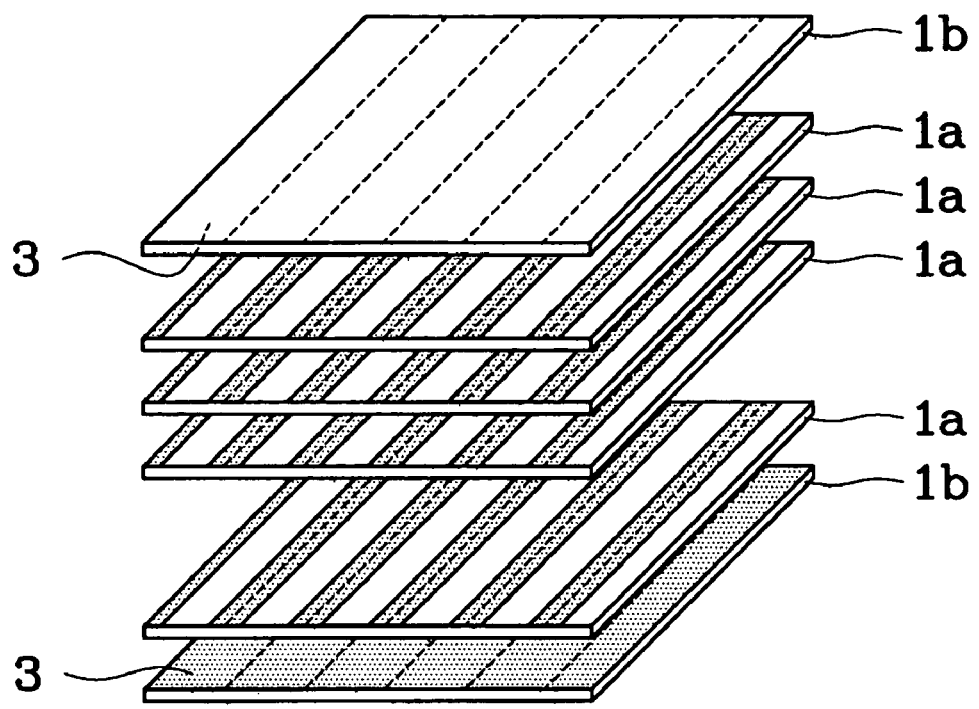
FIGS. 2A and 2B are schematic perspective views showing a step of a method of manufacturing a chip-type ceramic electronic component according to a preferred embodiment of the present invention.

Next, as shown in FIG. 2A, the ceramic green sheets 1a and 1b are laminated. In this lamination, the ceramic green sheets 1b are disposed on the outermost side so that the main surfaces having the inorganic paste 3 coated thereon face inward.

Figure 2B:
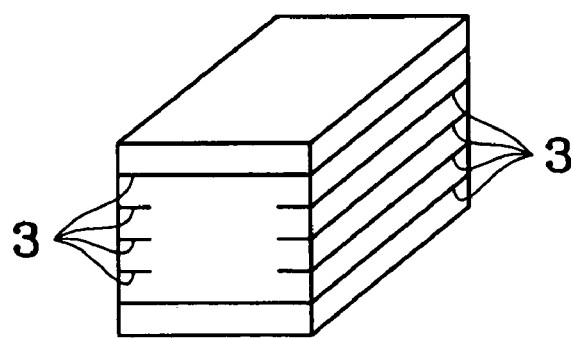

Next, the resultant ceramic laminated product is cut into chips at the predetermined cutting portions to obtain a plurality of chips 4 each containing layers of the inorganic paste 3, as shown in FIG. 2B.

Figure 3:
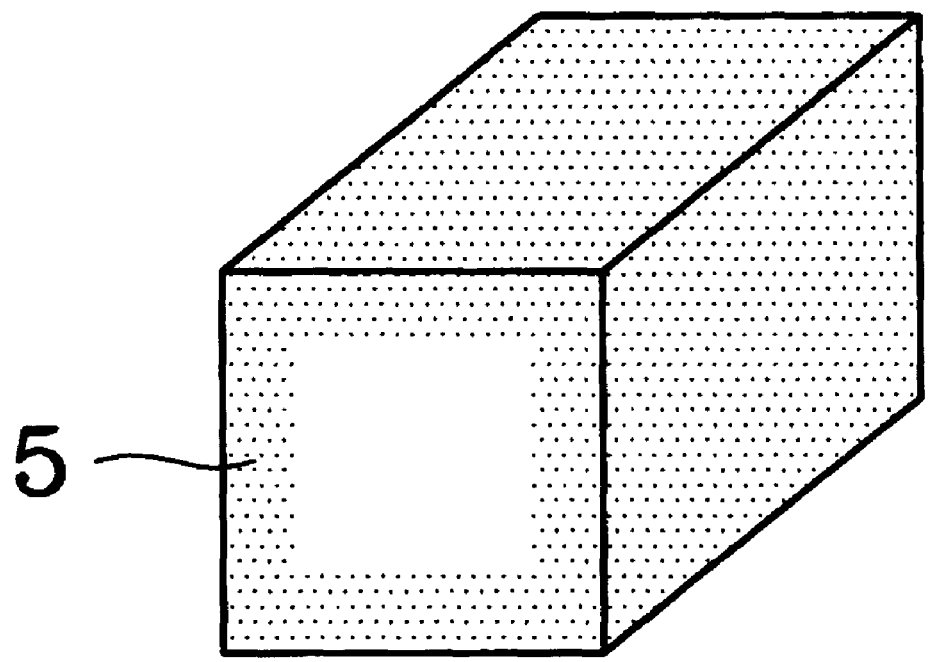
FIG. 3 is a schematic perspective view showing a step of a method of manufacturing a chip-type ceramic electronic component according to a preferred embodiment of the present invention.

Next, each of the chips 4 is sintered to obtain a ceramic sintered compact 6 including an inorganic material-diffused layer 5 formed near the outer surface, as shown in FIG. 3. During sintering, the ceramic material included in the diffused layer 5 and the ceramic material included in the ceramic sintered compact 6 function as a common material, thereby securing bonding between the diffused layer 5 and the ceramic sintered compact 6. Therefore, the occurrence of cavities in the diffused layer 5 can be prevented.

Figure 4:
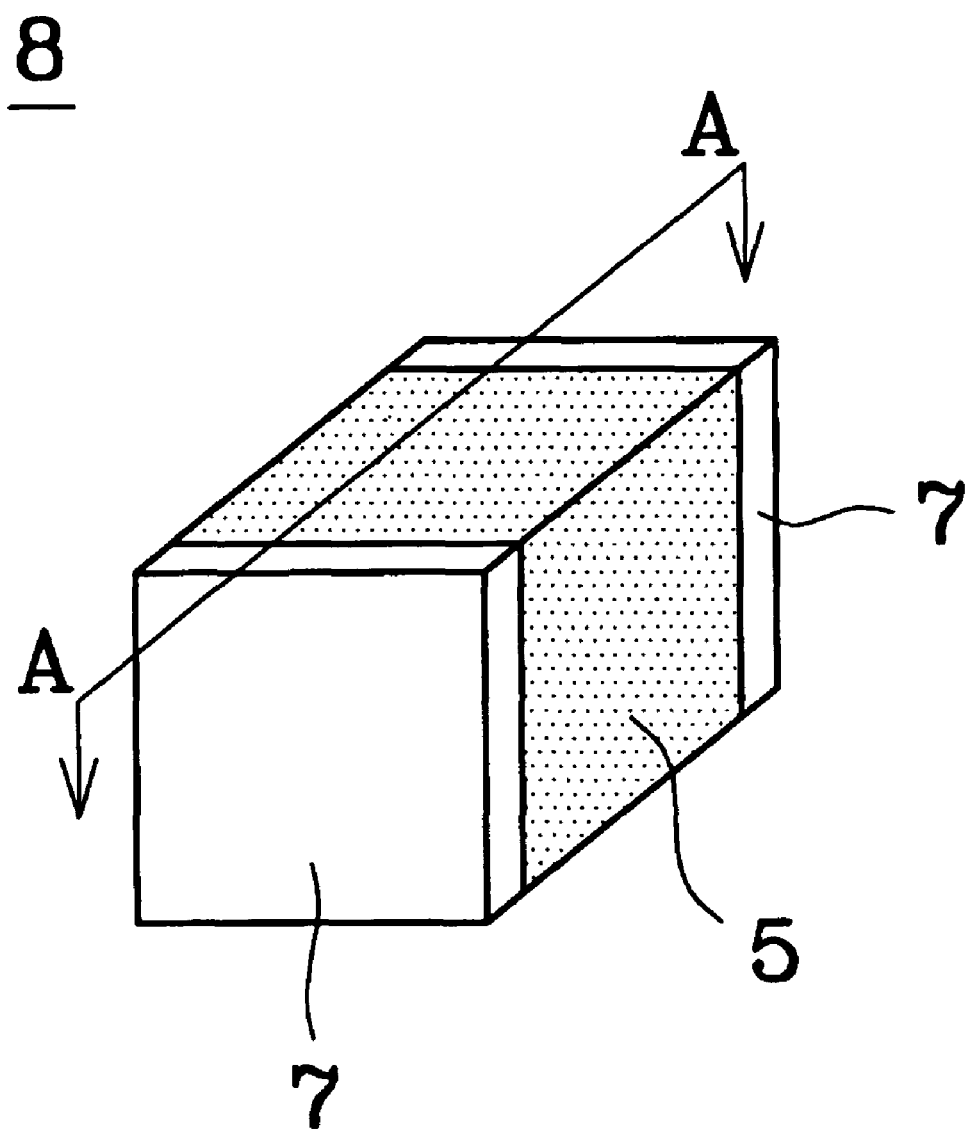
FIG. 4 is a schematic perspective view showing a step of a method of manufacturing a chip-type ceramic electronic component according to a preferred embodiment of the present invention.
Figure 5:
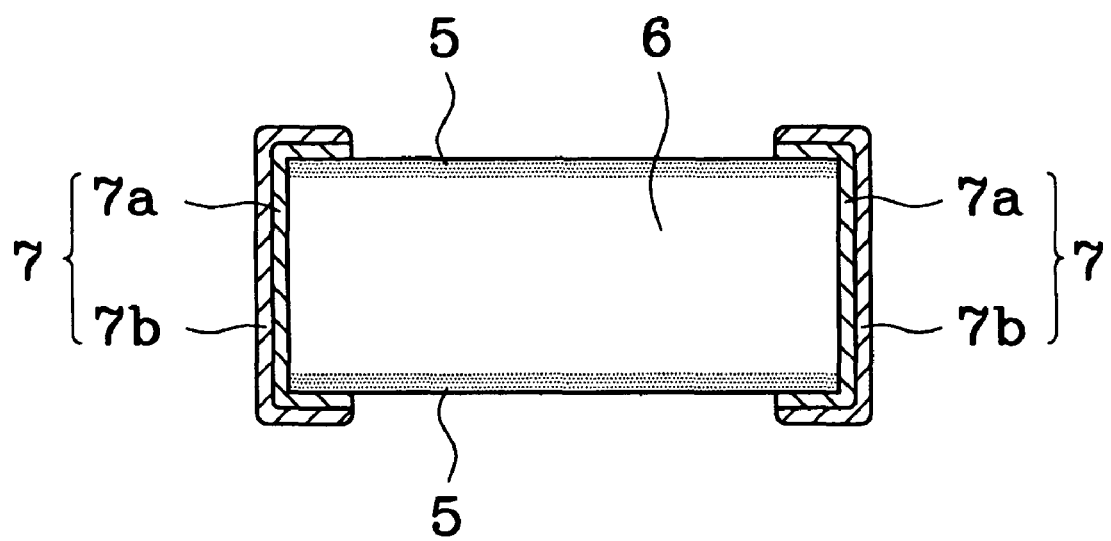
FIG. 5 is a schematic sectional view showing a chip-type ceramic electronic component according to a preferred embodiment of the present invention.
Figure 6:
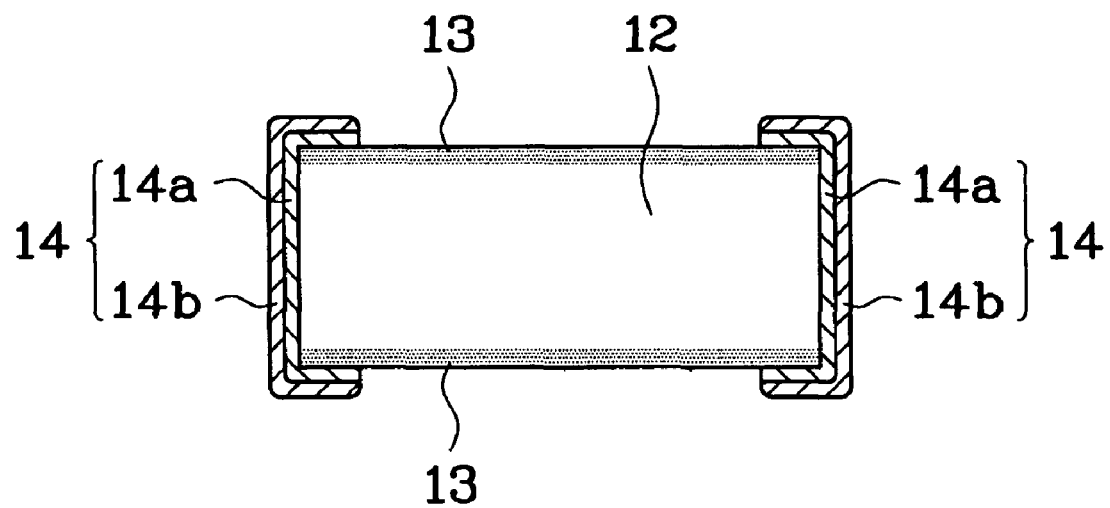
FIG. 6 is a sectional view showing a conventional chip-type thermistor.
Figure 7:
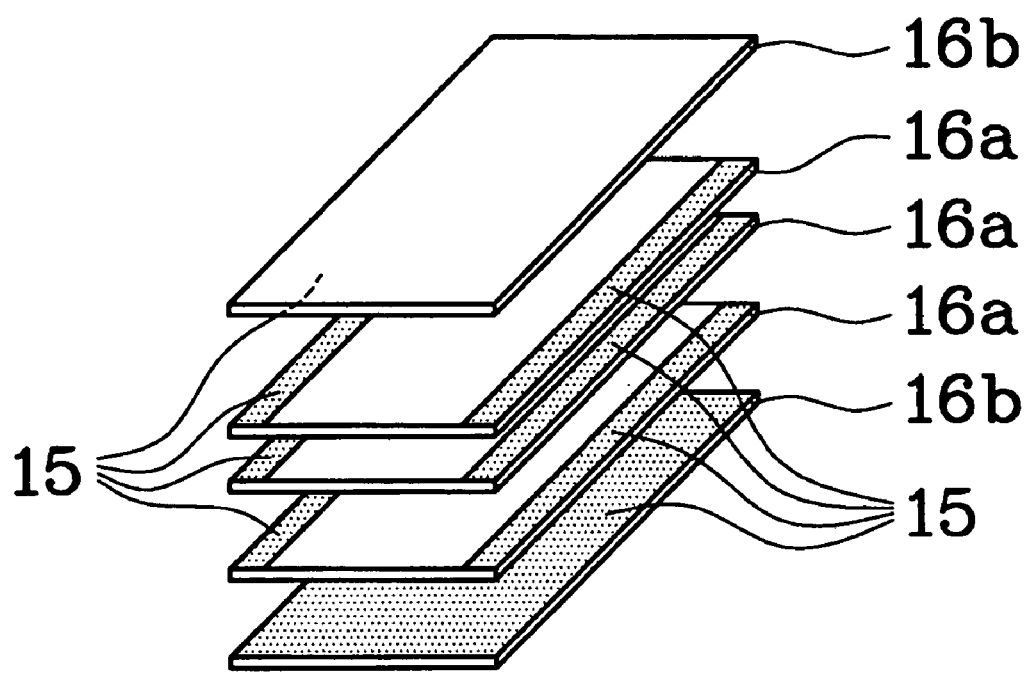
FIG. 7 is a schematic perspective view showing a conventional method of manufacturing a chip-type thermistor.
Figure 8:
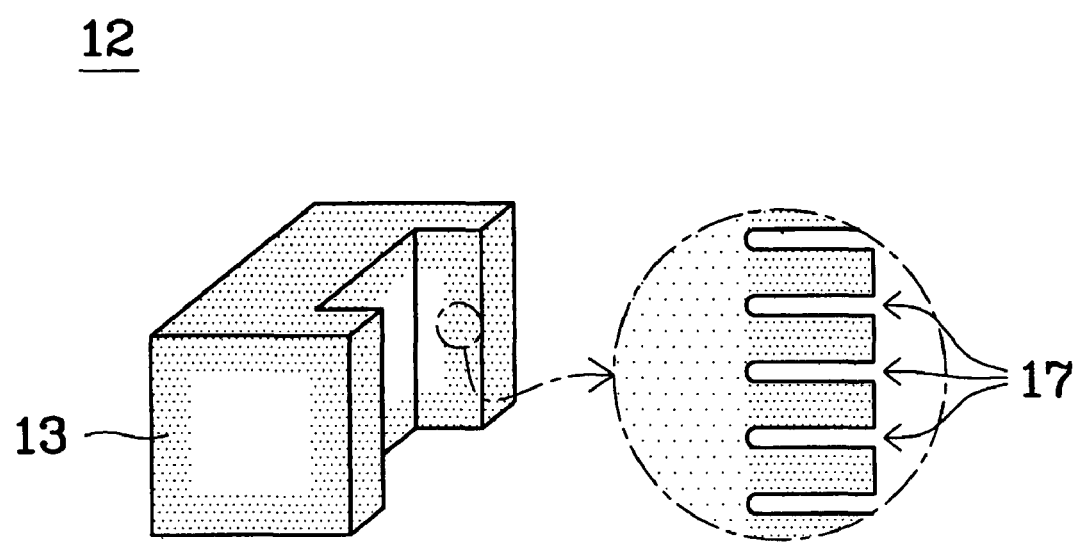
FIG. 8 is a partially cut-away perspective view of a conventional chip-type thermistor, including an enlarged partial sectional view.

Next, as shown in FIG. 4, external electrodes 7 are formed at both ends of the ceramic sintered compact 6 to obtain a chip-type ceramic electronic component 8. FIG. 5 is a sectional view taken along line A—A in FIG. 4. As shown in FIG. 5, each of the external electrodes 7 includes an underlying electrode layer 7a, and a plated layer 7b. The underlying electrode layer 7a is formed by coating electrode paste composed of Ag at both ends of the ceramic sintered compact 6, and then baking the coating, for example. The plated layer 7b is formed by depositing two metal layers of Ni and Sn, for example, on the underlying electrode layer 7a by an electrolytic plating process.

In the thus-formed chip-type ceramic electronic component 8, the diffused layer 5 can prevent penetration of the plating solution, thereby preventing corrosion of the ceramic sintered compact 6. Therefore, the chip-type ceramic electronic component 8 has stable electrical properties and excellent mechanical strength.

The chip-type ceramic electronic component of this preferred embodiment has no internal electrode. However, ceramic green sheets each having electrode paste coated on a main surface may be laminated, and the ceramic green sheets, the electrode paste and inorganic paste may be sintered together to prepare a ceramic sintered compact having internal electrodes. The ceramic sintered compact may be used for a chip-type ceramic electronic component.

EXAMPLES OF PREFERRED EMBODIMENTS

A chip-type thermistor was formed by the method of manufacturing the chip-type ceramic electronic component according to preferred embodiments of the present invention, and evaluated with respect to the characteristics as described below.

First, metal oxide powders of $Mn_3O_4$, NiO, $Co_3O_4$, and CuO were prepared, and mixed at a predetermined ratio. Next, predetermined amounts of an organic binder, a dispersant, and a solvent were added to the mixed powder and mixed therewith to form ceramic slurry. Next, the ceramic slurry was formed into a sheet by a doctor blade process to form a ceramic green sheet.

Then, plural types of inorganic paste to be coated on the ceramic green sheet were prepared.

First, the same metal oxide powders of $Mn_3O_4$, NiO, $Co_3O_4$, and CuO as those used for forming the ceramic green sheet, a borosilicate glass powder and an $Al_2O_3$ powder were prepared as inorganic powders to be included in the inorganic paste.

Next, the metal oxide powders of $Mn_3O_4$, NiO, $Co_3O_4$, and CuO were mixed at the same ratio as that for forming the ceramic green sheet. Then, an organic binder, a dispersant, and a solvent were added to the resultant mixed powder to form inorganic paste. The inorganic paste was coated on an alumina substrate, and baked at about 1100° C. As a result of measurement, the resistivity of the resultant thick film was about 30 Ω·cm.

Next, the metal oxide powders of $Mn_3O_4$, NiO, $CO_3O_4$ and CuO were mixed at the same ratio as that for forming the ceramic green sheet. Then, about 50% by weight of the resultant mixed powder was mixed with about 50% by weight of the borosilicate glass powder, and an organic binder, a dispersant, and a solvent were further added to the resultant mixture to form inorganic paste as Sample 1. The inorganic paste of Sample 1 was coated on an alumina substrate, and then baked at approximately 1000° C. As a result of measurement, the resistivity of the resultant thick film was about 5000 Ω·cm.

Next, the metal oxide powders of $Mn_3O_4$, NiO and $CO_3O_4$ at a total ratio of about 95% by weight were mixed with about 5% by weight of $Al_2O_3$ powder. Then, an organic binder, a dispersant, and a solvent were added to the resultant mixture to form inorganic paste as Sample 2. The inorganic paste of Sample 2 was coated on an alumina substrate, and then baked at about 1200° C. As a result of measurement, the resistivity of the resultant thick film was about 570 Ω·cm.

Next, an organic binder, a dispersant and a solvent were added to the borosilicate glass powder to form inorganic paste as Sample 3. The inorganic paste of Sample 3 was coated on an alumina substrate, and then baked at about 900°

C. As a result of measurement, the resistivity of the resultant thick film was about 106 Ω·cm.

Also, an organic binder, a dispersant and a solvent were added to the $Al_2O_3$ powder to form inorganic paste. The inorganic paste was coated on an alumina substrate, and then baked at approximately 1300° C. As a result of measurement, the resistivity of the resultant thick film was about 109 Ω·cm.

Each of the inorganic pastes of Samples 1 to 3 obtained as described above was coated on the ceramic green sheets in the same manner as shown in FIG. 2A, and a plurality of the ceramic green sheets each having the inorganic paste coated thereon were laminated to prepare three ceramic laminated products. The three ceramic laminated products were formed under the same conditions.

Next, each of the ceramic laminated products was cut at the predetermined cutting positions, and then sintered at approximately 1100° C. for 2 hours to form a ceramic sintered compact including the inorganic material diffused to the outer surface. Next, underlying electrode layers were formed by baking Ag paste at both ends of each ceramic sintered compact, and plated layers each including two layers of Ni and Sn were further formed by electrolytic plating to form external electrodes. The ceramic sintered compacts were formed under the same conditions, and the external electrodes were formed under the same conditions.

The chip-type thermistors formed by using the inorganic pastes of Samples 1, 2 and 3 were represented by Examples 1 and 2 and Comparative Example, respectively. On the other hand, a chip-type thermistor was formed as Reference Example, apart from the three chip-type thermistors, under the same conditions as those for forming the three chip-type thermistors except that the inorganic paste was not coated on a ceramic green sheet.

Next, each of the chip-type thermistors of Examples 1 and 2, Comparative Example and Reference Example was subjected to a life shelf test and measurement of flexural strength (N). In the life shelf test, a sample was allowed to stand at approximately 60° C. at about 95% RH for 1000 hours and stand in a cold-hot cycle of about −40° C. to about 125° C. for 1000 hours to measure resistance values. The measured resistance values were compared with a normal resistance value at about 25° C. to examine changes of resistance. The results are shown in Table 1.

TABLE 1

|  | Change (%) of resistance at 60° C. at 95% RH | Change (%) of resistance in cycle of −40° C. to 125° C. | Flexural strength (N) |
|---|---|---|---|
| Example 1 | 0.44 | 0.36 | 54.1 |
| Example 2 | 0.49 | 0.36 | 54.0 |
| Comparative Example | 0.71 | 0.47 | 52.6 |
| Reference Example | 1.81 | 1.63 | 36.3 |

Table 1 indicates that in Examples 1 and 2, the changes of resistance at about 60° C. at about 95% RH are smaller than that in Comparative Example, and thus moisture resistance is excellent. It is also found that in Examples 1 and 2, changes of resistance in the cold-hot cycle of about −40° C. to about 125° C. are smaller than that in Comparative Example, and thus durability is excellent. It is further found that Examples 1 and 2 are excellent in flexural strength, as compared with Comparative Example.

It can easily seen from the above experimental results that the present invention effectively prevents cavitation of an inorganic material-diffused layer to prevent corrosion of a ceramic sintered compact during electrolytic plating.

In the present invention, an inorganic material including the same ceramic material as that included in ceramic green sheets and an inorganic material having higher resistivity than that of the ceramic material is coated on each of ceramic green sheets, and then the ceramic green sheets are laminated and then sintered. As a result, a high-resistivity inorganic material-diffused layer is formed on the outer surface of a ceramic sintered compact, and bonding between the diffused layer and the ceramic sintered compact is improved to prevent cavitation of the diffused layer. Therefore, penetration of a plating solution into the ceramic sintered compact can be prevented during electrolytic plating, thereby forming a chip-type ceramic electronic component having stable electrical properties and excellent mechanical strength.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A method of manufacturing a chip-type ceramic electronic component comprising the steps of:
   preparing ceramic green sheets having predetermined cutting positions;
   coating an inorganic material on a region of each of the ceramic green sheets, inclusive of the predetermined cutting positions;
   laminating a predetermined number of the ceramic green sheets to form a ceramic laminated product;
   cutting the ceramic laminated product into a chip at the predetermined cutting positions, and sintering the chip to form a ceramic sintered compact; and
   forming external electrodes at both ends of the ceramic sintered compact;
   wherein the inorganic material includes the same ceramic material as that included in the ceramic green sheets, and an inorganic material having higher resistivity than that of the ceramic material.

2. The method according to claim 1, wherein the ceramic green sheets are formed from a slurry including an organic binder, a dispersant, a surfactant, an antifoaming agent, a solvent, and a ceramic powder.

3. The method according to claim 1, wherein the inorganic material is coated in such a manner that the inorganic material is present at ends of each of the ceramic green sheets after the step of cutting.

4. The method according to claim 1, wherein oxides of at least two metals selected from Mn, Ni, Ca, Fe and Cu are used as the ceramic material, and a metal oxide of Al, Si, Zn, and glass is used as the inorganic material having higher resistivity than that of the ceramic material.

5. The method according to claim 1, wherein the inorganic material includes a total of 100% by weight of Inorganic materials, the content of the same ceramic material as that included in the ceramic green sheets is about 5% to about 50% by weight, and the content of the inorganic material having higher resistivity than that of the ceramic material is preferably about 50% to about 95% by weight.

6. The method according to claim 1, wherein each of the external electrodes includes an underlying electrode layer and a plated layer.

* * * * *